United States Patent
Cass

[11] 3,740,113
[45] June 19, 1973

[54] LIGHT GUIDE

[75] Inventor: Michael Cass, Welwyn Garden City, England

[73] Assignee: Imperial Chemical Industries, Limited, London, England

[22] Filed: Feb. 16, 1970

[21] Appl. No.: 11,431

[30] Foreign Application Priority Data
Mar. 13, 1969 Great Britain............ 13,205/69

[52] U.S. Cl. ............... 350/96 R, 350/312
[51] Int. Cl. .......................... G02b 5/14
[58] Field of Search ........ 350/96 R, 96 B, 96 WG, 350/312, 267, 179; 250/227

[56] References Cited
UNITED STATES PATENTS

| | | | |
|---|---|---|---|
| 3,363,174 | 1/1968 | Hudson et al. | 350/96 R X |
| 3,492,493 | 1/1970 | Herriot et al. | 350/96 R X |
| 3,434,776 | 3/1969 | Kern | 350/96 |
| 2,827,825 | 3/1958 | White | 350/96 X |
| 3,030,852 | 4/1962 | Courtney-Pratt | 350/96 B |
| 3,510,195 | 5/1970 | Noble | 350/96 B |

FOREIGN PATENTS OR APPLICATIONS 1,037,498   7/1966   Great Britain.............. 350/96 R

OTHER PUBLICATIONS

Tove, Article in "The Review of Scientific Instruments" Vol. 27, No. 3 March, 1956 pgs. 143–146.
Kapany "Fiber Optics" Textbook published 1967 pgs. 298–302, 304, 310 & 311.

Primary Examiner—David H. Rubin
Attorney—Cushman, Darby & Cushman

[57] ABSTRACT

A flexible light guide comprises a flexible tube of a transparent thermoplastic containing a transparent liquid having a higher refractive index than the thermoplastic. The tubing may be of a polymer or copolymer of 4-methyl pentene-1 or any clear plastic tubing.

9 Claims, 1 Drawing Figure

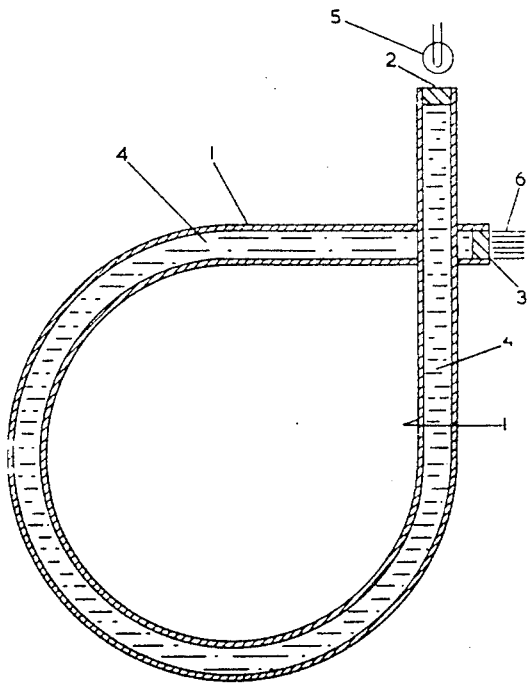

LIGHT GUIDE

The present invention relates to light guides and in particular to flexible light guides.

Light guides are used to pipe light and flexible light guides are available which can be used to illuminate inaccessible areas. These light guides comprise a bundle of fibres of light transmitting material contained in a flexible sheath of a suitable material, for example, polyethylene. In such light guides, light enters the fibre at one end, and passes along the length of the fibre either directly, or in a zig-zag path by total internal reflection of the light within the fibre. These fibres have conventionally been glass fibres, and light guides using glass fibres are expensive to produce. As an alternative to glass fibres, it has been proposed to use fibres of acrylic polymers, typically polymethylmethacrylate. Whilst such fibres are more readily produced than glass fibres, in forming fibre light guides of either type, since the arrangement and alignment of the fibres is an operation requiring great care and therefore time, the production of such light guides is an expensive procedure.

According to the present invention there is provided a flexible light guide comprising a flexible tube of a transparent thermoplastic material, which tube is closed at either end with a plug of a transparent material; and contains a transparent fluid having a refractive index which is greater than that of the thermoplastic material.

In this manner there is obtained a light guide which is simple and inexpensive to produce. Surprisingly, most thermoplastic materials presently available either are not sufficiently flexible or do not have the requisite transparency for use in accordance with the present invention. Thus, polyethylene and polypropylene can be formed into flexible tubing but these materials are not sufficiently transparent to be used in accordance with the present invention. Conversely, materials such as acrylic polymers, for example, polymethylmethacrylate, or polystyrene, have sufficient transparency to function as a light guide, but are insufficiently flexible to give a suitable flexible light guide. Clear polyvinyl chloride is both flexible and transparent, but has a high refractive index and this means there are few satisfactory liquids available for use with this polymer. We have found, however, that polymers of 4-methyl pentene-1 can be formed into tubing which is sufficiently flexible and also transparent, and furthermore that the refractive index of this polymer is less than that of polyvinyl chloride and thus a wider range of suitable liquids is available. It is a further advantage of 4-methyl pentene-1 polymers compared to polyvinyl chloride, that using a given liquid in the thermoplastic tube, the critical angle for total internal reflection is less with the 4-methyl pentene-1 polymer than with polyvinyl chloride, thereby permitting the tubing to be bent more sharply with the same loss of light through the sides of the tube. A further advantage of 4-methyl pentene-1 polymer is that, like other polyolefines, it possesses good chemical resistance to a number of transmitting fluids.

The plug of transparent material at either end of the tube may be formed of any suitable transparent material. Although for compatibility, it might be preferred that the plug is of the same material as the tube, materials such as acrylic polymers or glass can also be used for the end plugs. One of the end plugs is preferably secured into position before the liquid is introduced into the tube and the other end plug is then fitted into position when the tube has been filled with the liquid. The plug may be sealed to the tube by heat sealing but, once the liquid has been introduced into the tube, it is preferred to secure the second plug using a suitable adhesive or cement.

If desired, to produce a coloured light, the liquid in the light guide may be coloured, this conveniently being effected by adding an appropriate coloured soluble dyestuff to the liquid. Alternatively, a coloured filter can be located at one end of the light guide to give the desired colour, which permits several different colours to be obtained using one light guide and a number of movable coloured filters.

Flexible light guides in accordance with the invention can be used to illuminate several instruments on an instrument panel in a car or aircraft using only one light source, a number of light guides directing light from the source to the appropriate instrument on the panel. Alternatively, particularly using a tube formed of a copolymer of 4-methyl pentene-1 with a high (for example 10 percent by weight) content of a linear olefine comonomer, such as hexene-1, octene-1 or decene-1, a flexible light guide is obtained which has a good heat resistance (the melting point of 4-methyl pentene-1 polymers is about 240° C) and can be sterilised and thus used in surgical applications or in industry where high temperatures can be experienced. Very satisfactory flexible light guides may be formed using copolymers of 4-methyl pantene-1 and from 4 to 6 percent by weight of a linear olefine comonomer, particularly decene-1.

As indicated herein, polymers, including copolymers, of 4-methyl pentene-1 are particularly suitable for use in accordance with the present invention, and some suitable polymers are described in British Pat. Nos. 942,297; 968,935; 1,001,801; 1,014,886 and 1,085,914. Particularly suitable 4-methyl pentene-1 polymers are sold under the Trade Mark 'TPX'-RT methyl pentene polymers by Imperial Chemical Industries Limited.

It will be appreciated that the liquid used must be compatible with the polymer and a number of liquids which are generally suitable for use with 4-methyl pentene-1 polymers, together with the refractive index of the liquid, are set out in the following table:

| Liquid | Refractive Index |
|---|---|
| Benzyl alcohol | 1.54 |
| Nitrobenzene | 1.556 |
| Linseed Oil | 1.48 |
| Chlorobenzene | 1.525 |
| Caster Oil | 1.477 |
| Camphor | 1.546 |
| Sikicone fluid* | 1.49 |

*sold by General Electric as S.F. 1017

Chlorobenzene diffuses through 4-methyl pentene-1 polymers and thus is not completely suitable for use with such polymers. Many silicones have a refractive index in the range 1.40 to 1.43 and are accordingly unsuitable since this is less than the refractive index of 4-methyl pentene-1 polymers. By way of comparison, the refractive index of 'TPX' is 1.465 and that of clear polyvinyl chloride is 1.543. It will be seen that few of the liquids noted in the table have a higher refractive index than polyvinyl chloride and those that do have a higher refractive index have only slightly greater refractive indices and thus will give little total internal reflection within the tube. For this reason, 4-methyl pentene-1 polymers are much more suitable than polyvinyl chloride for use in accordance with the present invention. Of the liquids set out in the table, benzyl alcohol has been found to be particularly good in respect of giving high light transmission.

EXAMPLE

A 4 foot long tube of 'TPX'-RT having a ¼ inch external diameter and a wall thickness of 0.020 inches was filled with benzyl alcohol. Using a 12 volt, 10 watt festoon bulb as the light source, a beam of light was emitted from the other end of the tube when bent through an angle of 360°. A similar effect was obtained when caster oil was used as the liquid medium, although a smaller quantity of light was transmitted. When water was used as the liquid, no light was transmitted through the bent tube. The refractive index of water is 1.333, which is substantially less than that of 'TPX'.

The experiment was repeated using similar tubes formed from copolymers of 4-methyl pentene-1 with 4 percent or 6 percent by weight of decene-1. The liquid used was benzyl alcohol. These tubes are more flexible than the 'TPX'-RT tube and are also less susceptible to stress whitening or yielding. Otherwise, a similar effect was obtained as with the 'TPX'-RT tube.

The accompanying drawing is a sectional view of a light guide in accordance with the present invention being used to "bend" light through an arc of 270°.

A tube 1 of 'TPX'-RT is sealed at either end by a transparent end plug 2 and 3, also of 'TPX'-RT. The sealed tube 1 contains caster oil (4) as the liquid filling the tube 1. The tube is bent through an arc of 270° C, and a light source 5 is located adjacent to the end plug 2. Light from the source 5 passes through the plug 2 and into the caster oil 4. Most of the light undergoes total internal reflection at the inner surface of the tube 1 and ultimately emerges from the tube 1 through the end plug 3, as a beam of light shown diagrammatically at 6. The tube 1 is flexible and can be moved about so that the light beam 6 emerging from the end plug 3 may be aimed in any desired direction. Not all the light is internally reflected at the inner surface of the tube 1, some passes straight through the tube 1 and is lost. The main losses of light occur in the initial section of the passage of the light through the tube 1, and also a the initial curved section of the tube. These losses can be reduced by the use of a liquid having a higher refractive index than caster oil, such as benzyl alcohol. A further source of light losses is from the presence of irregularities on the inner surface of the tube, and for the best results the internal surface of the tube 1 has to be absolutely smooth and free from any flow defects.

If desired, the tube 1 may be enclosed along the whole of its length by an opaque flexible outer sheath (not shown), thus leaving exposed only the end plugs 2 and 3 through which light enters and leaves the tube. Any suitable material may be used for this outer sheath, which can conveniently be a flexible black polythene sheath.

I claim:

1. A flexible light guide consisting essentially of a tube of a transparent flexible thermoplastic material selected from transparent polyvinyl chloride and 4-methyl pentene-1 polymers, a plug of a transparent material at either end of the tube to close the tube, and a transparent fluid within the tube filling it, wherein said fluid has a refractive index greater than that of the thermoplastic material and is selected from nitrobenzene, camphor, linseed oil, chlorobenzene, castor oil, and benzyl alcohol.

2. The light guide of claim 1 wherein the plug of transparent material is selected from an acrylic polymer, glass, and the same material as the flexible tube.

3. The light guide of claim 1 wherein the fluid in the tube is a liquid which is coloured with a dyestuff soluble in the liquid.

4. The light guide of claim 1 wherein the tube is formed of clear polyvinyl chloride and the fluid is selected from nitrobenzene and camphor.

5. The light guide of claim 1 wherein the tube is formed of a 4-methyl pentene-1 polymer and the fluid is selected from camphor and benzyl alchol.

6. The light guide of claim 5 wherein the 4-methyl pentene-1 polymer is a copolymer with a linear olefine.

7. The light guide of claim 6 wherein the 4-methyl pentene-1 polymer is a copolymer with a linear olefin selected from hexene-1, octene-1 or decene-1.

8. The light guide of claim 6 wherein the copolymer contains up to 10 percent by weight of the linear comonomer.

9. The light guide of claim 8 wherein the copolymer contains from 4 to 6 percent by weight of the linear comonomer.

* * * * *